United States Patent
Goldman et al.

(10) Patent No.: US 7,051,351 B2
(45) Date of Patent: May 23, 2006

(54) SYSTEM AND METHOD OF INSERTING ADVERTISEMENTS INTO AN INFORMATION RETRIEVAL SYSTEM DISPLAY

(75) Inventors: Phillip Y. Goldman, Los Altos, CA (US); Michael A. Killianey, San Mateo, CA (US); Daniel J. Zigmond, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 70 days.

(21) Appl. No.: 09/264,432

(22) Filed: Mar. 8, 1999

(65) Prior Publication Data

US 2003/0135853 A1 Jul. 17, 2003

(51) Int. Cl.
*H04N 7/025* (2006.01)
*H04N 7/10* (2006.01)

(52) U.S. Cl. .............................. 725/34; 725/14; 725/110
(58) Field of Classification Search ............. 725/13–20, 725/32–36, 109–113
See application file for complete search history.

(56) References Cited

U.S. PATENT DOCUMENTS

| | | | |
|---|---|---|---|
| 3,919,479 A | 11/1975 | Moon et al. ............... 179/1 SB |
| 4,677,466 A | 6/1987 | Lert, Jr. et al. ............... 358/84 |
| 4,788,682 A | 11/1988 | Vij et al. ................. 370/110.1 |
| 5,105,184 A | 4/1992 | Pirani et al. ................ 340/721 |
| 5,136,636 A | 8/1992 | Wegrzynowicz ............ 379/207 |
| 5,172,413 A | 12/1992 | Bradley et al. ............... 380/20 |
| 5,233,423 A | 8/1993 | Jernigan et al. ............ 358/181 |
| 5,353,121 A | * 10/1994 | Young et al. ................. 725/52 |
| 5,382,970 A | 1/1995 | Kiefl .............................. 348/1 |
| 5,410,326 A | 4/1995 | Goldstein ................... 348/134 |
| 5,412,416 A | 5/1995 | Nemirofsky ................. 348/10 |
| 5,488,423 A | 1/1996 | Walkingshaw et al. ..... 348/460 |
| 5,524,195 A | 6/1996 | Clanton, III et al. ........ 395/155 |

(Continued)

FOREIGN PATENT DOCUMENTS

| | | | |
|---|---|---|---|
| EP | 811940 A2 | * 12/1997 |
| JP | 6314184 | 8/1994 |
| WO | 96/30864 | 10/1996 |
| WO | WO 9856128 A1 | * 12/1998 |

OTHER PUBLICATIONS

"*Cyber View: On–Line Advertising Goes One–on–One*," Scientific American, Dec. 1997.

*Primary Examiner*—John Miller
*Assistant Examiner*—Scott Beliveau
(74) *Attorney, Agent, or Firm*—Workman Nydegger (57) ABSTRACT

Systems and methods for selecting and inserting advertisements in an information document displayed to a user, wherein the selection is based at least in part on television programming viewed by the user. The systems and methods may be implemented using the Internet or another information retrieval system that includes a client system and a remote server. The client system monitors television programming viewed by the user and compiles a user profile characterizing the television programming. When the user requests an Internet resource using the client system, the television programming information in the user profile is utilized to select an appropriate advertisement. The advertisement is then inserted in the information document and displayed to the user. Advertisement selection and insertion may be conducted at the remote server, the client system, or at the level of the Internet service provider. Such selection of advertisement increases the efficiency by which Internet advertisements are tailored to individuals. Instead of advertisements, information relating to the television programming may be retrieved over the Internet and displayed without direct user assistance.

40 Claims, 8 Drawing Sheets

U.S. PATENT DOCUMENTS

| | | | |
|---|---|---|---|
| 5,532,735 A | 7/1996 | Blahut et al. | 348/13 |
| 5,559,549 A | 9/1996 | Hendricks et al. | 348/6 |
| 5,566,353 A | 10/1996 | Cho et al. | 455/2 |
| 5,600,364 A | 2/1997 | Hendricks et al. | 348/1 |
| 5,600,366 A | 2/1997 | Schulman | 348/9 |
| 5,636,346 A | 6/1997 | Saxe | 395/201 |
| 5,659,653 A | 8/1997 | Diehl et al. | 386/46 |
| RE35,651 E | 11/1997 | Bradley et al. | 380/20 |
| 5,734,720 A * | 3/1998 | Salganicoff | 380/211 |
| 5,801,747 A * | 9/1998 | Bedard | 725/13 |
| 5,809,242 A * | 9/1998 | Shaw et al. | 709/217 |
| 5,809,471 A * | 9/1998 | Brodsky | 725/112 |
| 5,819,156 A * | 10/1998 | Belmont | 725/14 |
| 5,887,133 A * | 3/1999 | Brown et al. | 707/540 |
| 5,918,014 A * | 6/1999 | Robinson | 707/10 |
| 5,933,811 A | 8/1999 | Angles et al. | 705/14 |
| 5,948,061 A | 9/1999 | Merriman et al. | 709/219 |
| 5,991,735 A | 11/1999 | Gerace | 705/10 |
| 6,006,257 A | 12/1999 | Slezak | 709/219 |
| 6,009,410 A | 12/1999 | LeMole et al. | 705/14 |
| 6,085,229 A * | 7/2000 | Newman et al. | 709/203 |
| 6,133,912 A * | 10/2000 | Montero | 725/37 |
| 6,134,532 A * | 10/2000 | Lazarus et al. | 705/14 |
| 6,177,931 B1 * | 1/2001 | Alexander et al. | 725/52 |
| 6,182,050 B1 * | 1/2001 | Ballard | 705/14 |
| 6,268,856 B1 * | 7/2001 | Bruck et al. | 707/501.1 |
| 6,311,185 B1 * | 10/2001 | Markowitz et al. | 707/10 |
| 6,317,791 B1 * | 11/2001 | Cohn et al. | 725/42 |
| 6,327,574 B1 * | 12/2001 | Kramer et al. | 705/14 |
| 6,345,289 B1 * | 2/2002 | Lotspiech et al. | 709/203 |
| 6,353,813 B1 * | 3/2002 | Breese et al. | 707/3 |
| 6,438,751 B1 * | 8/2002 | Voyticky et al. | 725/42 |
| 6,457,010 B1 * | 9/2002 | Eldering et al. | 707/10 |
| 6,487,538 B1 * | 11/2002 | Gupta et al. | 705/14 |
| 6,698,020 B1 * | 2/2004 | Zigmond et al. | 725/34 |
| 2002/0095676 A1 * | 7/2002 | Knee et al. | 725/46 |

* cited by examiner

SYSTEM AND METHOD OF INSERTING ADVERTISEMENTS INTO AN INFORMATION RETRIEVAL SYSTEM DISPLAY

BACKGROUND OF THE INVENTION

1. The Field of the Invention

The present invention relates to advertising on an information retrieval system. In particular, the present invention relates to systems and methods of selecting advertisements and displaying the selected advertisements on an information retrieval system based at least in part on the television viewing habits of the recipient of the advertisements.

2. The Prior State of the Art

The Internet, and particularly the World Wide Web ("Web"), has experienced tremendous growth during recent years. The Web allows users to retrieve and access text, graphics, audio, video, and other information from remote servers. The Web has become a valuable source of news, educational resources, commercial information, entertainment, and the like. Many, if not most, Web sites are accessible by users free of charge. Other sites are made available to users for a small fee. Many Web sites subsidize part or all of the cost of maintaining a server, posting information in Web pages, etc. by selling and distributing advertisements embedded in Web pages.

As in other advertising applications, it has been found that advertisements in Web pages are most effective if they can be tailored and directed to segments of the population that are likely to be interested in the advertised goods and services. Because of the interactive nature of the Internet and the ability to easily insert graphical images in Web pages, there have been developed several methods of targeting Internet advertisements to specific users or specific groups of users.

One of the simplest methods of tailoring Internet advertisements to recipients is similar to techniques used in television, radio and other media. In particular, advertisements are selected to correspond to the subject matter of the Web page or other Internet resource. It is assumed that users who actively retrieve Internet resources dealing with a certain topic are more likely than the population at large to be receptive to advertisements directed to the topic. For example, if a Web site relates to travel information, advertisers and Web site providers can generally assume that users accessing the Web site will have a heightened interest in travel-related advertisements.

Advertisements are particularly attractive in the Internet environment for several additional reasons. First, Internet users are typically actively and attentively taking in information when they access Internet resources. Such users may be more receptive to messages delivered by advertisers than persons engaged in other activities. Second, because of the interactive nature of the Internet, recipients of advertising may choose to receive a small amount or a relatively large amount of information on the advertised goods or services. For example, a typical Internet advertisement may consist of a banner box or another graphical image identifying the goods or services or presenting a concise advertising message. Moreover, the graphical image is frequently an active link that may be selected by the user in order to access a Web site specifically dedicated to the advertised goods or services. Accordingly, interested recipients may easily retrieve additional information relating to advertiser's message, while disinterested recipients are not inconvenienced by too much unwanted information. The multimedia aspect of the Internet also allows advertisers to present their messages in new and interesting ways.

In addition to basing advertisement selection on the subject matter of Web sites, advertisers have also been able to learn of some preferences and habits of recipients in order to more effectively tailor advertisements. Many Web sites download "cookies" to users' computers when users access the Web sites. Cookies are files installed and stored on the hard disk of client computers and are used to report information relating to the client computer to Web site content providers. In one example, a cookie may merely be an identifier that transmits a user password or other identifying information each time the user returns to the Web site, thereby eliminating the need for the user to remember and enter the password. In another example, however, cookies can be used to track and report the user's Internet habits, giving content providers and advertisers insight into the possible interests of the user, and allowing advertisements to be tailored accordingly.

Services that automatically provide news and other information to recipients over the Internet have also become common. For example, there are many e-mail services and other Internet-based systems that periodically send messages or other information documents relating to specific topics to interested persons. Generally, such services provide information to recipients who have placed their names in a subscriber list. There is typically no attempt to individually tailor the information sent to the subscribers based on the subscribers' particular preferences other than perhaps an interest survey submitted by the subscribers.

In view of the foregoing, advertising techniques adapted from other media have been widely used to tailor advertisements to broad segments of the Internet-using population. Furthermore, interactive techniques, such as those involving "cookies", allow advertisers to learn of some of the recipient's habits as they relate to browsing Internet and otherwise using the recipient's computer. While such information increases the efficiency by which advertisers may target specific recipients, any further source of information relating to individual habits and preferences would be a valuable improvement in the Internet advertising industry.

From the standpoint of the advertiser, any increase in the ability to narrowly target recipients would make advertising on the Internet more attractive. Internet content providers would also favor advancements in advertising effectiveness, since they would then collect more advertising fees from advertisers. Finally, the Internet-using public benefits from being more effectively targeted in at least two ways. First, advertising recipients would be more likely to receive advertising information that is of interest and value. Second, a greater number and variety of Internet sites are likely to be profitable using improved advertising techniques, thereby making more no-cost and low-cost Internet sites available to the public.

SUMMARY AND OBJECTS OF THE INVENTION

The present invention relates to selecting advertisements and displaying the selected advertisements on a display screen of an information retrieval system based at least in part on the television viewing habits of the recipient of the advertisements. For example, the information retrieval system may be the Internet, with the advertisements being embedded and displayed in a Web page or another Internet resource. Monitoring the television viewing habits of the recipient allows the advertisements to be more effectively tailored to the specific habits and preferences of the recipient.

The invention may be implemented in an information retrieval system including a client terminal and a remote server configured to communicate one with another. In Internet implementations, an Internet service provider ("ISP") may also be present in order to facilitate and route information transmission over the system. Moreover, the client terminal is connected to, associated with, or otherwise has access to a television set or a television programming feed. According to the invention, the client terminal monitors television programming viewed by the user, and includes the television viewing habits in a user profile.

When the user requests an information document, such as a Web page, from a remote server, the user profile is used in conjunction with selection criteria to select an advertisement appropriate for the user. Data representing the selected advertisement is inserted into the information document, and when the information document is displayed to the user, the selected advertisement is also displayed. The process of selecting and inserting the advertisement may be conducted according to any of at least three methods. In particular, the advertisement selection and insertion may be conducted at the client computer, at the server computer, and in Internet implementations, at the ISP. Moreover, selection and insertion may be conducted at any combination of the foregoing sites.

The foregoing methods of advertisement selection and insertion more generally extend to selection and display of any type of information to a recipient based at least in part on television viewing habits. As described herein, the client terminal monitors television programming viewed by the user and compiles a user profile. The user profile is compared against a list of information categories, which may be standard or user-defined. One or more of the information categories that correspond to the user profile are then used to request information documents from the server computer. For example, the invention may be implemented in an Internet news delivery service wherein the information categories correspond to particular categories of news stories. Accordingly, information such as news, entertainment, educational resources, and the like, may be selected based at least in part on the television viewing habits of the recipient, automatically retrieved, and made available to the recipient.

In view of the foregoing, the invention disclosed herein provides methods and systems for tailoring advertisements and other information to specific recipients in ways that have not previously been possible. Monitoring the television viewing habits of recipients allows advertisers and content providers to gain valuable insight to the preferences of the users. Accordingly, the advertisements or other selected information is more likely to be relevant and of interest to the recipient using the invention than using conventional methods.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to selecting and displaying advertisements or other information on a display device of an information retrieval system based at least in part on the television viewing habits of the recipient. A client terminal or the like monitors the television viewing habits of the recipient, which are included in a user profile. The user profile, in combination with selection criteria, may be used to select advertisements for display to the recipient. When the recipient requests an information document using the information retrieval system or when an information document is otherwise delivered to the client terminal, the selected advertisement is inserted into the information document and is displayed to the recipient.

The invention is described below by using diagrams to illustrate either the structure or processing of embodiments used to implement the system and method of the present invention. Using the diagrams in this manner to present the invention should not be construed as limiting of its scope. The embodiments of the present invention may comprise a special purpose or general purpose computer including various computer hardware, as discussed in greater detail below. The embodiments may further comprise multiple computers linked in a network environment.

Embodiments within the scope of the present invention include computer readable media having computer-executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired computer-executable instructions or data fields and which can accessed by a general purpose or special purpose computer. Combinations of the above should also be included within the scope of computer readable media. Computer-executable instructions comprise, for example, instructions and data which cause a general purpose computer, special purpose computer, or special purpose processing device to perform a certain function or group of functions. The computer-executable instructions and associated data fields represent an example of program code means for executing the steps of the invention disclosed herein.

Figure 1:
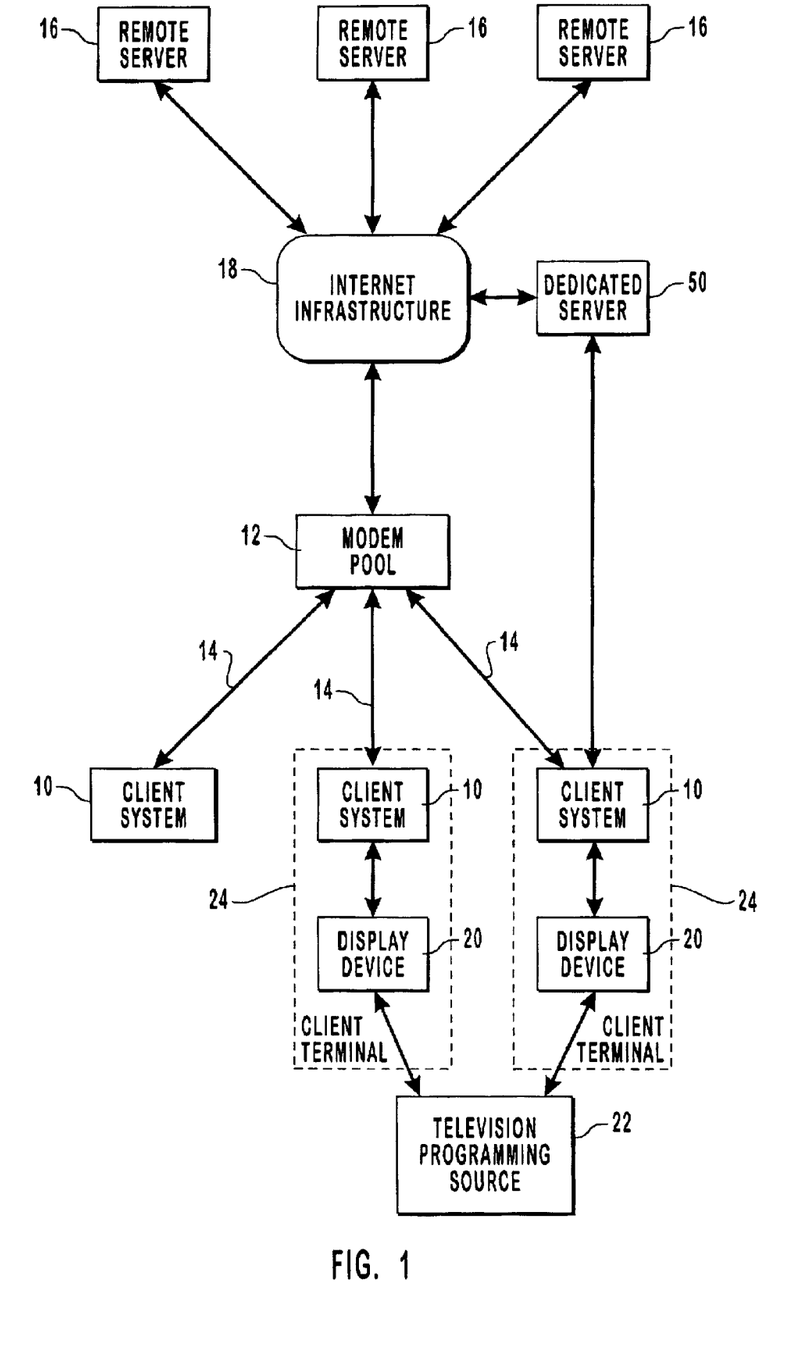
FIG. 1 is a schematic diagram illustrating a network system in which the invention may be implemented, wherein the network system includes client terminals, servers, and a television programming source.
Figure 2:
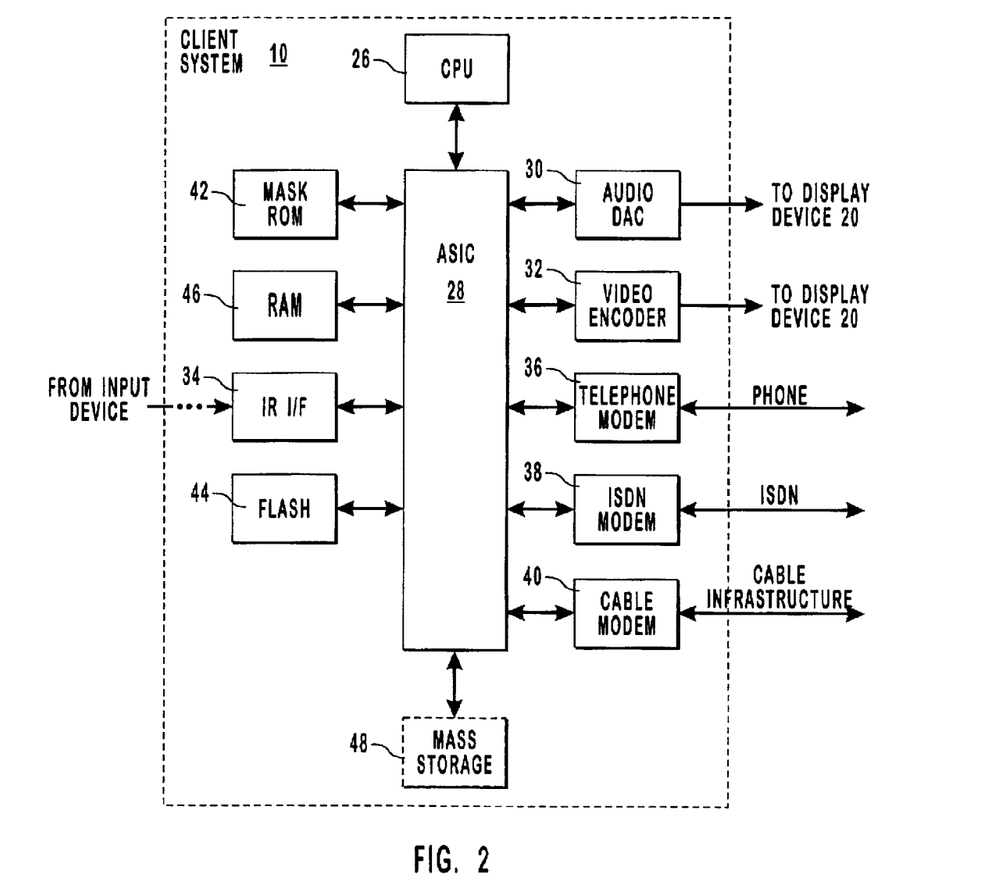
FIG. 2 is a schematic diagram of one embodiment of a client system for use with the invention.

FIGS. 1 and 2 and the following discussion are intended to provide a brief, general description of a suitable network and computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. The invention will also be described by making reference to information documents, which generally include or are defined by encoded data structures stored in a computer-readable medium or a computer memory device. The encoded data structures of documents typically represent text, graphical images, audio, or other information that may be communicated to a user, and generally may be generated, edited, displayed and/or stored using a computer. The information documents may be Web pages or other Internet resources.

For illustration purposes, the invention is described herein in reference to the Internet, which represents one example of information retrieval systems that are compatible with the invention. However, the principles disclosed herein are also applicable to other information retrieval systems. Accordingly, it is to be understood that the invention is not to be limited to the Internet. Those skilled in the art will understand how to implement the invention in other information retrieval systems upon learning of the information disclosed herein.

FIG. 1 illustrates one embodiment of the architecture of an information retrieval system in which the invention may be implemented. In this embodiment, multiple clients systems 10 communicate with a modem pool 12 by means of direct-dial, bi-directional data connections 14, which may be conventional telephone lines, ISDN connections, connections supported by cable television providers, or any other suitable communications channel. Modem pool 12 may be any conventional modem pool, such as those that are currently used for providing access to the Internet and other wide area networks. For example, modem pool 14 may be provided by a local ISP. Thus, modem pool 12 may be coupled to a number of server computers, such as remote servers 16, via a conventional network infrastructure, which may be Internet infrastructure 18.

FIG. 1 further illustrates an example of combining information retrieval over the Internet with television viewing. At least some of client systems 10 are associated with display devices 20 that serve a dual function. First, display devices 20 display graphical, computer-generated or computer-transmitted information provided by client systems 10. Web pages retrieved from remote servers 16 represent one example of the graphical information that may be displayed on display devices 20. Second, television programming transmitted from television programming source 22 may also be displayed on display devices 20. Television programming source 22 may be any desired television broadcaster or delivery system. Accordingly, display device 20 may be a conventional television or may instead be a computer monitor adapted to display television programming. Indeed, the client system is optionally integrated in a television, or instead may be a self-contained unit. The invention extends to systems incorporating the information retrieval systems disclosed herein in combination with a home entertainment system including a television or another display device 20. It is also noted that client terminal 24 is defined herein to include the client system and the display device.

FIG. 2 depicts selected elements of one embodiment of a client system that may be used to implement portions of the invention. Client system 10 uses hardware and computer-executable instructions for providing the user with a graphical user interface, by which the user can access Internet resources, send and receive e-mail, and optionally receive other information services. Operation of client system 10 is controlled by a central processing unit (CPU) 26, which is coupled to an application-specific integrated circuit (ASIC) 28. CPU 26 executes computer-executable instructions designed to implement features of client system 10, including some of the steps of methods of the present invention. ASIC 28 contains circuitry which is used to implement certain functions of client system 10. For example, ASIC 28 may be coupled to an audio digital-to-analog converter 30 and to a video encoder 32, which provide audio and video output, respectively, to display device 20 of FIG. 1.

Client system 10 may further include an IR interface 34 for detecting infrared signals transmitted by a remote control input device, such as a hand-held device or a wireless keyboard. In response to the infrared signals, IR interface 34 provides corresponding electrical signals to ASIC 28. Alternatively, the signals transmitted by the remote control device may be selected from another suitable region of the spectrum. A standard telephone modem 36 and an ISDN modem 38 are coupled to ASIC 28 to provide connections to modem pool 12 and, via the Internet 18, to remote servers 16. While the client system illustrated in FIG. 2 includes both a telephone modem and an ISDN modem, either one of these devices is sufficient to support the communications of the client system. Furthermore, in other embodiments, modems 36 and 38 may be supplemented or replaced with cable modem 40 or another suitable communications device. In other environments, communication may instead be established using a token ring or Ethernet connection.

Also coupled to ASIC 28 are a mask read-only memory (ROM) 42, a flash memory 44, and a random access memory (RAM) 46. Mask ROM 42 is non-programmable and provides storage of computer-executable instructions and data structures. Flash memory 44 may be a conventional flash memory device that can be programmed and erased electronically. Flash memory 44 may store Internet browser software as well as data structures. In one embodiment, a mass storage device 48 coupled to ASIC 28 is included in client system 10. Mass storage device 48 may be used to supply computer-executable instructions and data structures to other components of the client system or to receive data downloaded over the network. Mass storage device 48 may include any suitable medium for storing computer-executable instructions, such as magnetic disks, optical disks, and the like.

Application software and associated operating system software are stored in flash memory 44, or instead may be stored in any other suitable memory device, such as mask ROM 42 or mass storage device 48. The computer-executable instructions that, according to one embodiment of the invention, are used to monitor television viewing habits of a user and to construct a user profile that forms at least part of the basis for selecting advertisements are executed by CPU 26. In particular, CPU 26 executes sequences of instructions contained in one or more of mask ROM 42, flash memory 44, and RAM 46 to perform certain steps of the present invention that will be more specifically disclosed hereinafter.

In one embodiment of the invention, client system 10 is a WEBTV® client box manufactured by WebTV Networks, Inc. of Palo Alto, Calif. One reason that WEBTV® client boxes may be conveniently used with the invention is that they include television interface features that combine Internet browsing with television viewing. For example, the display device that is typically used to graphically display Web resources retrieved by a WEBTV® system is a conventional television. Furthermore, WEBTV® client boxes may be adapted to monitor television viewing habits as further disclosed herein. Alternatively, client system 10 may be any of a variety of systems for providing access to the Internet or other information retrieval systems. When a WEBTV® client box is used as client system 10, the network architecture illustrated in FIG. 1 may further include a dedicated server 50, which is dedicated to providing information specifically to WEBTV® clients boxes.

The elements of client system 10 are not limited to those depicted in FIG. 2. For example, the invention may be used with other computer system configurations, including personal computers, hand held devices, multiprocessor systems, microprocessor-based or programmable consumer electronics, network PCs, minicomputers, mainframe computers, and the like. The invention may also be practiced in distributed computing environments other than the network environment of FIG. 1. For example, the invention may be used in any suitable network environment where tasks are performed by remote processing devices that are linked through a communications network.

Figure 3A:
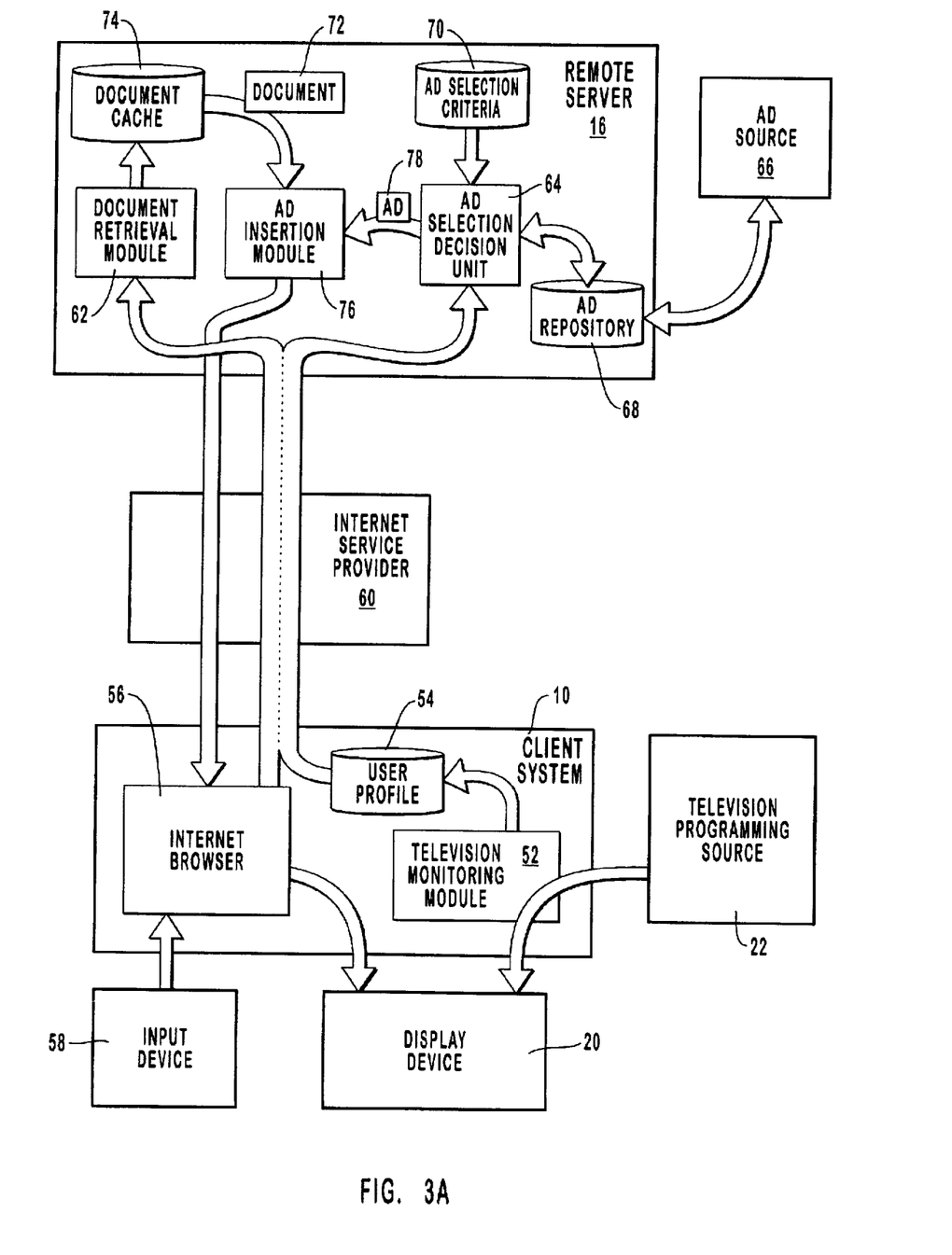
FIG. 3A is a schematic diagram depicting a first embodiment of the systems and methods of the invention, wherein an advertisement is selected and inserted into an information document at the server computer.
Figure 3B:
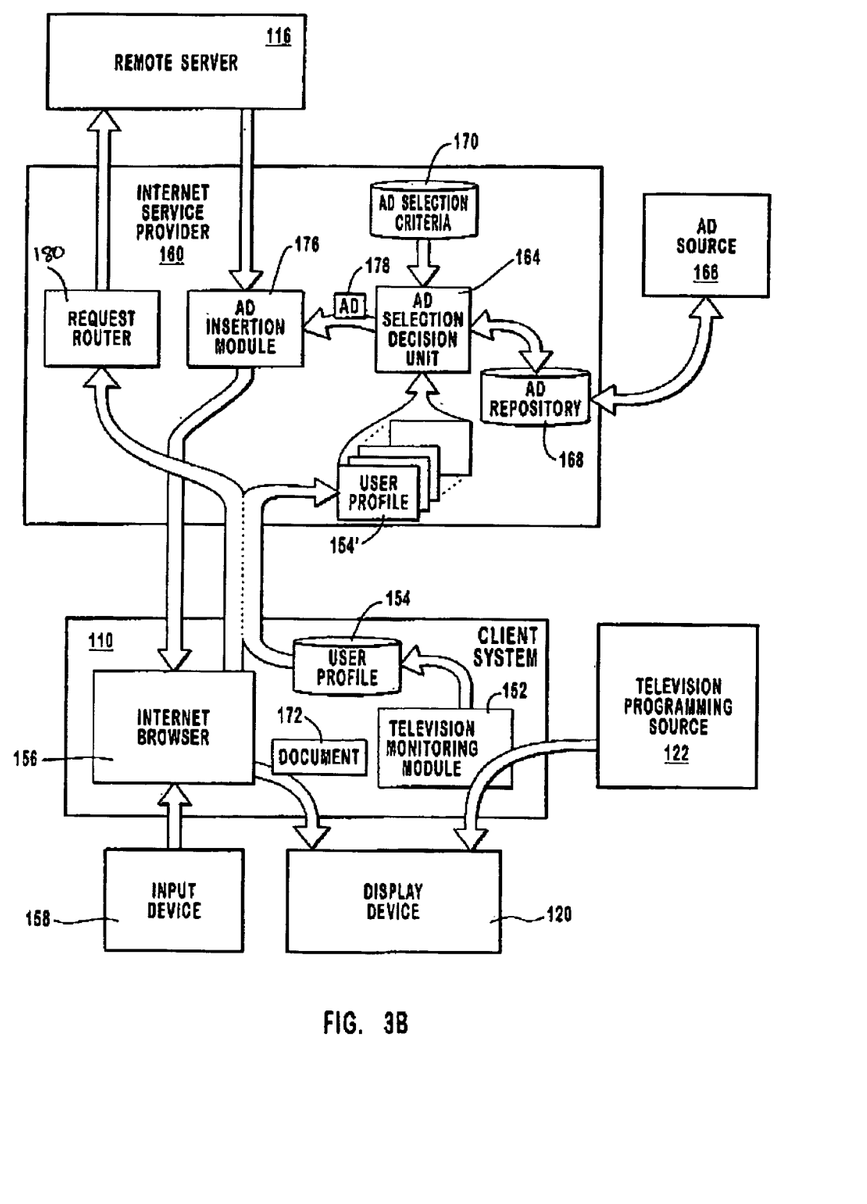
FIG. 3B is schematic diagram showing a second embodiment of the systems and methods of the invention, wherein an advertisement is selected and inserted into an information document at the level of the Internet service provider.
Figure 3C:
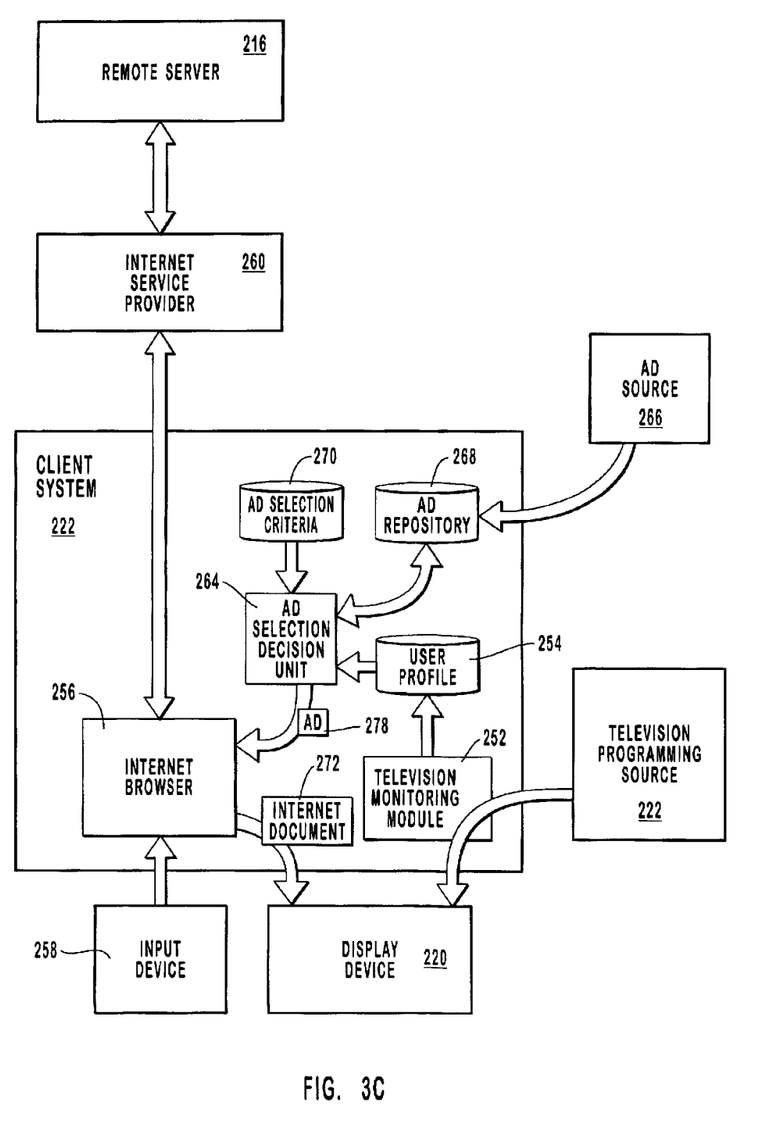
FIG. 3C is a schematic diagram illustrating a third embodiment of the systems and methods of the invention, wherein an advertisement is selected and inserted into an information document at the client system.

FIGS. 3A–3C illustrate three embodiments of the invention, wherein advertisements are selected and inserted into an information document based at least in part on television viewing habits of the recipient. In general, the embodiments of FIGS. 3A–3C are configured to monitor the television viewing habit of a user of the client system and to construct a user profile that includes the television viewing habits. Based at least in part on the television viewing habits, an appropriate advertisement is selected according to advertisement selection criteria. The selected advertisement is inserted into an Internet document and is displayed to the user on the display device. Advertisement selection and insertion is conducted at the remote server in FIG. 3A and at the Internet service provider and the client system in FIGS. 3B and 3C, respectively.

Turning now to FIG. 3A, television programming source 22 broadcasts a television programming feed that is displayed to the user on display device 20. A television monitoring module 52 at client system 10 has access to the television programming feed and detects the identity or the content of the television programming used by the user. A more detailed description of one embodiment of a television monitoring module is disclosed herein in reference to FIG. 6.

A user profile 54 compiled at client system 10 is a profile of the user of the client system 10 and includes at least information relating to the television programming displayed on display device 20. User profile 54 may also include other user information further characterizing the user. Examples of such user information include demographic information, Internet usage data, geographical information, or other identifying information. U.S. patent application Ser. No. 09/094,851, filed on Jun. 15, 1998, discloses user profiles and specific example of user information, many of which may be included in the user profiles of the present invention. For purposes of disclosure, the foregoing patent application is hereby incorporated by reference.

The information included in user profile 54 may be compiled over any desired period of time. For example, user profile 54 may be updated each time the user views a television program. Information relating to viewed television programming may be retained in user profile 54 for a set period of time. According to one option, the most recently viewed television programming is given more weight in user profile 54 than older programming. Alternatively, user profile may include information relating to only the most recently viewed television programming.

Client system 10 provides Internet access to the user by means of an Internet browser 56, which may be any conventional or other Internet browser that is adapted or otherwise capable of transmitting information included in user profile 54 as further described herein. For example, when client system 10 is a WEBTV® (combined Internet browsing and television viewing) client box, Internet browser 56 is the Internet browser typically included in WEBTV® client boxes, with the browser being adapted to transmit user profile information. The Internet browser 54 included in client system 10 is one example of means for requesting an information document from a server computer.

A user enters commands to client system using input device 58, thereby requesting an information document from remote server 16. When client system 10 is a WEBTV® (combined Internet browsing and television viewing) client box, input device 58 may be a handheld remote control device or a wireless keyboard that allows the user to select and retrieve desired Internet resources. Alternatively, the input device may be a keyboard, a mouse, or another device that is conventionally used to provide user input to an Internet browser. It is noted that a user may access the Internet by means of the Internet browser 56 at any time after having viewed television programming on display device 20. For example, the user may interrupt television viewing to access the Internet or, alternatively, may access the Internet some time after having stopped watching television programming.

The Internet browser sends a uniform resource locator (URL) via Internet service provider 60 to a document retrieval module 62 at remote server 16. For example, the network architecture by which client system 10 communicates with remote server 16 may be that disclosed in FIG. 1. Methods and systems for retrieving an information document over the Internet or other information retrieval systems are well known in the art. In the embodiment of FIG. 3A, wherein advertisement selection and insertion into the information document is conducted at remote server 16, client system 10 further sends information from user profile 54 to an advertisement selection decision unit 64 at remote server 16. As previously noted, the information user profile 54 identifies the television viewing habits of the user of client system 10.

In this embodiment, remote server 16 includes features for providing a plurality of advertisements and for selecting and inserting an advertisement into the requested information document. In one implementation, an advertisement source 66 supplies a plurality of advertisements that are stored in advertisement repository 68. In one embodiment, advertisement source 66 and remote server 16 may be operated by the same party. Alternatively, advertisement source 66 may be operated independently from remote server 16 and located at a remote site. The plurality of advertisements provided by advertisement source 66 may be associated with a wide variety of advertisers and goods and services.

In this embodiment, remote server 16 further includes advertisement selection criteria 70, which, in conjunction with the user profile information, govern the selection of an advertisement stored in advertisement repository 68. For example, the selection criteria may provide that an advertisement whose subject matter corresponds to the television viewing habits of the user is to be selected. Optionally, advertisement selection criteria 70 further incorporates any of the conventional techniques for selecting advertisements, including selecting an advertisement to correspond to the subject matter of the requested information document.

Remote server 16 retrieves requested information document 72 from a document cache 74 according to methods that will be understood by those skilled in the art. The information document 72 may be provided by a content provider who is also the operator of remote server 16. Alternatively, the content provider who provides information document 72 may be an entity that purchases information document posting services from the operator of remote server 16. Information document 72 may be any Internet resource or another computer-displayable or computer-transmitted data structure. For example, Hyper-Text Markup Language documents ("HTML documents") are commonly retrieved over the Internet and are particularly suited for use with the invention.

An advertisement insertion module 76 inserts data representing selected advertisement 78 into information document 72 after it is retrieved. For example, the selected advertisement may be embedded in the information document 72 according to conventional techniques. After the selected advertisement is inserted, the requested information document 72 is transmitted from remote server 16 to client system 10. Internet browser 56 displays the information document 72 and the selected advertisement 78 on display device 20, which is one example of means for displaying the information document. In this manner, the user of the client system views an advertisement that is determined to be appropriate based at least in part on the television viewing habits of the user. Selecting and inserting the advertisement at the remote server is advantageously compatible with current techniques of advertisement insertion, which are also conducted at the remote server.

FIG. 3B illustrates an embodiment of the invention wherein advertisement selection and insertion are conducted at the level of the Internet service provider. Television programming is viewed by the user and a user profile 154 is compiled at client system 110 in much the same way as described herein in reference to FIG. 3A. When a user requests an information document from a remote server according to this embodiment, the URL is transmitted to the remote server via a request router 180 at the Internet service provider 160. The user profile, however, is transmitted to and stored at Internet service provider 160. Information from user profile 154 may be transmitted each time the user requests resources from the Internet, at the beginning of each Internet session that is served by Internet service provider 160, or periodically at any desired interval. For example, client system 110 may update user profile copy 154' on a daily basis, regardless of whether the user has accessed the Internet during the day. Furthermore, Internet service provider 160 may maintain user profile information associated with a plurality of client systems. The method of selecting advertisements at Internet service provider 160 may be substantially similar to the methods for selecting advertisements at remote server 16 described in reference to FIG. 3A. Alternatively, advertisement selection decision unit 164 may select appropriate advertisements for client system 110 and compile a list of appropriate advertisements before any information document is requested by client system 110. In this case, the preselected advertisements are already identified and available for insertion into requested information documents when the user begins to access to the Internet.

Advertisement insertion module 176 of FIG. 3B may insert the selected advertisement into the requested information document according to one of at least two methods. First, the information document transmitted from remote server 116 to Internet service provider 160 may include a vacant field or anther location to which the selected advertisement may be added. Second, advertisement insertion module 176 may overwrite an advertisement already included in the requested information document, thereby replacing the existing advertisement with the selected advertisement.

The requested information document, including the selected advertisement, is next transmitted from Internet service provider 160 to the Internet browser 156 at client system 110. The information document and the selected advertisement may be displayed at display device 120 according to the methods disclosed in reference to FIG. 3A. According to the embodiment of FIG. 3B, the user receives advertisements selected based at least in part on the television viewing habits of the user. Selecting and inserting the advertisements at the level of the Internet service provider have the advantage of allowing a periodically updated copy of the user profile to be stored at the Internet service provider. Accordingly, the Internet service provider may preselect advertisements for the users of a plurality of client systems.

FIG. 3C illustrates a further embodiment of the invention, wherein advertisements are selected and inserted at the client system. The methods and systems for viewing television programming, monitoring the television programming, and compiling a user profile may be substantially similar to those disclosed in reference to FIGS. 3A and 3B. In this embodiment, however, the advertisement selection decision unit 264, the advertisement repository 268, and the advertisement selection criteria 270 are located at the client system 210. The user requests an information document from remote server 216 via Internet service provider 260 according to methods that may be similar to those disclosed in reference to FIGS. 3A and 3B, with the exception that user profile information does not need to be transmitted from client system 210. In particular, a selected advertisement 278, which may be identified before the user requests any Internet resources from the remote server, may be inserted into retrieved information document by Internet browser 256.

As described in reference to FIG. 3B, selected advertisement 278 can be inserted into the information document at a vacant field, or instead may replace an advertisement already included in information document. The information document with the selected advertisement embedded therein is then displayed to the user on display device 220 according to the methods disclosed herein. According to this embodiment, the advertisements are selected and inserted without transmitting any information relating to television viewing habits from client system 210. Because the Internet service provider and the remote server do not have access to the television viewing habits of the user, the privacy of the user with respect to television habits is maintained.

Figure 4:
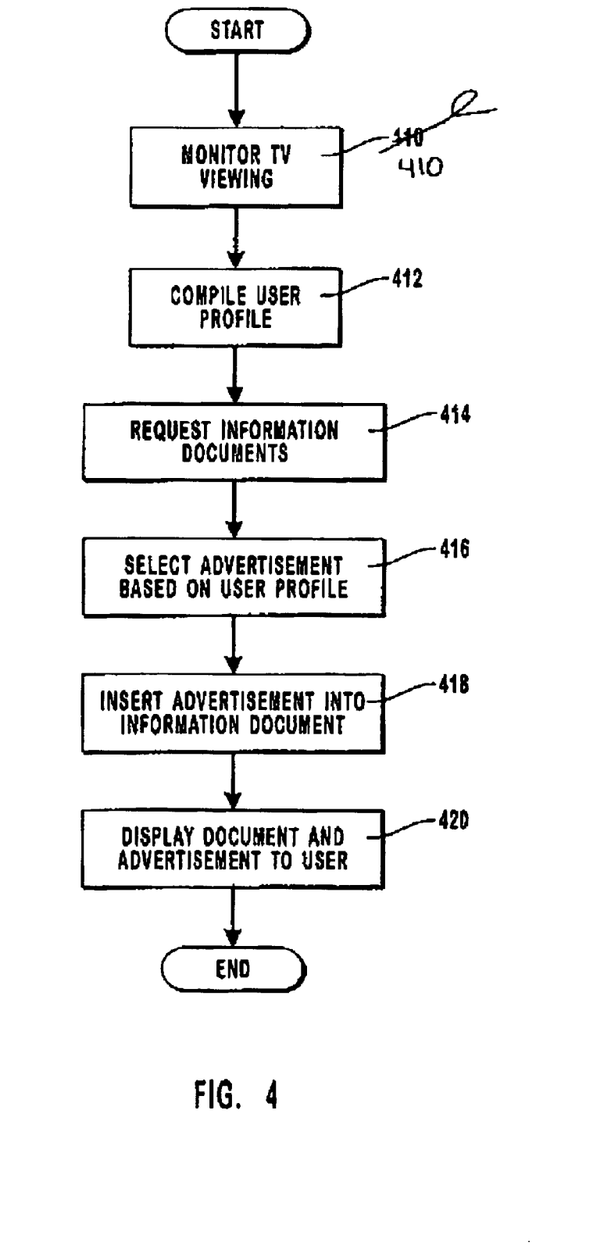
FIG. 4 is a flow diagram depicting selected steps of the methods associated with FIGS. 3A–3C.

FIG. 4 is a flow chart depicting selected steps of the methods associated with FIGS. 3A–3C. In step 410, the user views television programming, and the subject matter of the television programming is monitored at the client system. In step 412, the user profile, including information relating to the television viewing habits of the user, is compiled at the client system. The user requests an information document, such as a Web page, using an Internet browser at the client system as illustrated by step 414. In step 416, an advertisement determined to be appropriate based at least in part on the user profile is selected for insertion into the requested information document. The selected advertisement is then inserted in step 418 into the information document. Steps 416 and 418 may be conducted at the remote server, the Internet service provider, or the client system as disclosed in reference to FIGS. 3A–3C. Finally, the requested information document, including a selected advertisement, is displayed to the user according to step 420.

Figure 5:
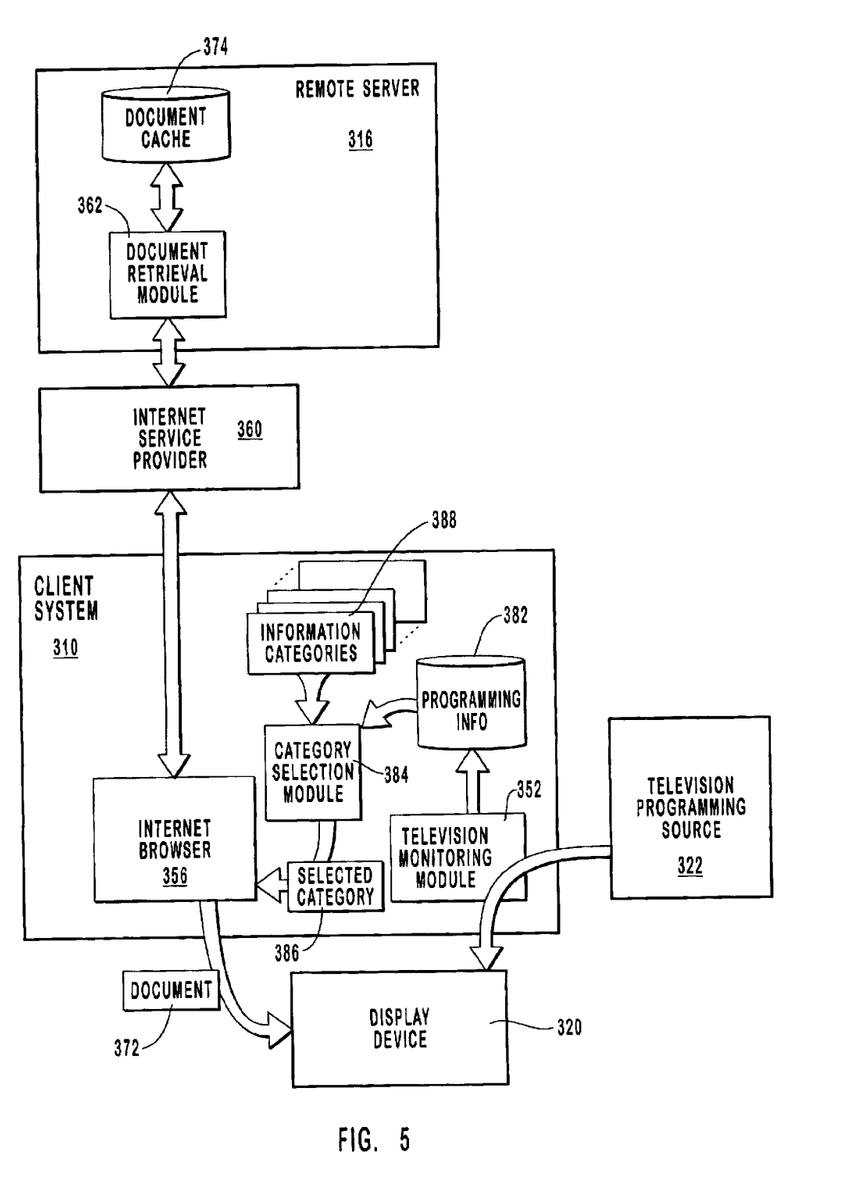
FIG. 5 is a schematic diagram showing a further embodiment of the systems and methods of the invention, wherein information classified under specified categories is selected, retrieved, and displayed based at least in part on the television viewing habits of the recipient.

FIG. 5 illustrates a further embodiment of the invention, wherein any type of information may be selected and displayed to a user based at least in part on the television viewing habits of the user. For example, the information displayed to the user may be news, educational resources, advertising, entertainment, or any other desired type of information. In one implementation, the information retrieval system automatically provides and displays reference information relating to the content of the television programming viewed by the user. For example, the reference information may include reviews, information about the cast, and other items of interest to television viewers.

According to the embodiment of FIG. 5, a television programming source 322 provides a television programming feed to display screen 320 according to methods described in reference to FIGS. 3A–3C. Furthermore, television monitoring module 352 detects the identity or content of the television programming viewed by the user and stores information relating thereto in programming information repository 382. For example, the programming information may identify one or more topics associated with the television programming. In this embodiment, client system 310 further includes a list of information categories 388, each being associated with information documents stored in a document cache 374 at remote server 316. A category selection module 384 compares the programming information with the information categories to select at least one information category 386 that corresponds to the television programming viewed by the user. The comparison of the programming information with the information categories 388 may be facilitated by selection criteria similar to the advertisement selection criteria disclosed in reference to FIGS. 3A–3C. By way of example, and not by limitation, the selection criteria may provide that a selected information category 386 is identified by looking for a direct match between a keyword in the programming information and a keyword in information categories 388.

When selected category 386 is identified, Internet browser 356 transmits a request to remote server 316 via Internet service provider 360 for one or more information documents associated with the selected category. Document retrieval module 326 then retrieves one or more information documents from document cache 374. These information documents are then downloaded to Internet browser 356 and displayed on display device 320. According to one option, the information document may be displayed on display device 320 simultaneously with the television programming. For example, the information document may be overlaid on a selected region of the display device 320 or the display device may be divided into a split-screen arrangement. According to another option, the information documents are displayed on display device 320 only when the television programming feed to display device 320 is terminated or when the user affirmatively indicates that it is appropriate to display the information documents.

Information categories 388 may be further tailored or narrowed to correspond to the viewing habits of the particular user, periodically updated from a remote source such as remote server 316, or selected by the user. For example, if it is noted that a user repeatedly views television programming related to sports, the information categories can be supplemented with subcategories relating to more narrow sports topics. One method of further tailoring information categories 388 to correspond to frequently viewed topics involves using a user profile similar to those described in reference to FIGS. 3A–3C. For example, a user profile indicating that the user frequently views particular sporting events may be used to retrieve subcategories from a remote server, which then can supplement the standard information categories 388. Direct user input may also be used to select or further refine information categories 388. This may be accomplished by providing a large list of information categories from which the user may pick and choose to identify the categories that are likely to be of most interest.

According to this embodiment of the invention, retrieval of news, entertainment, educational resources, or other information documents based at least in part on the television viewing habits of the user can be conducted automatically, with no user assistance. Such techniques provide automatic access to information that is likely to be of use and of interest to the recipient.

Figure 6:
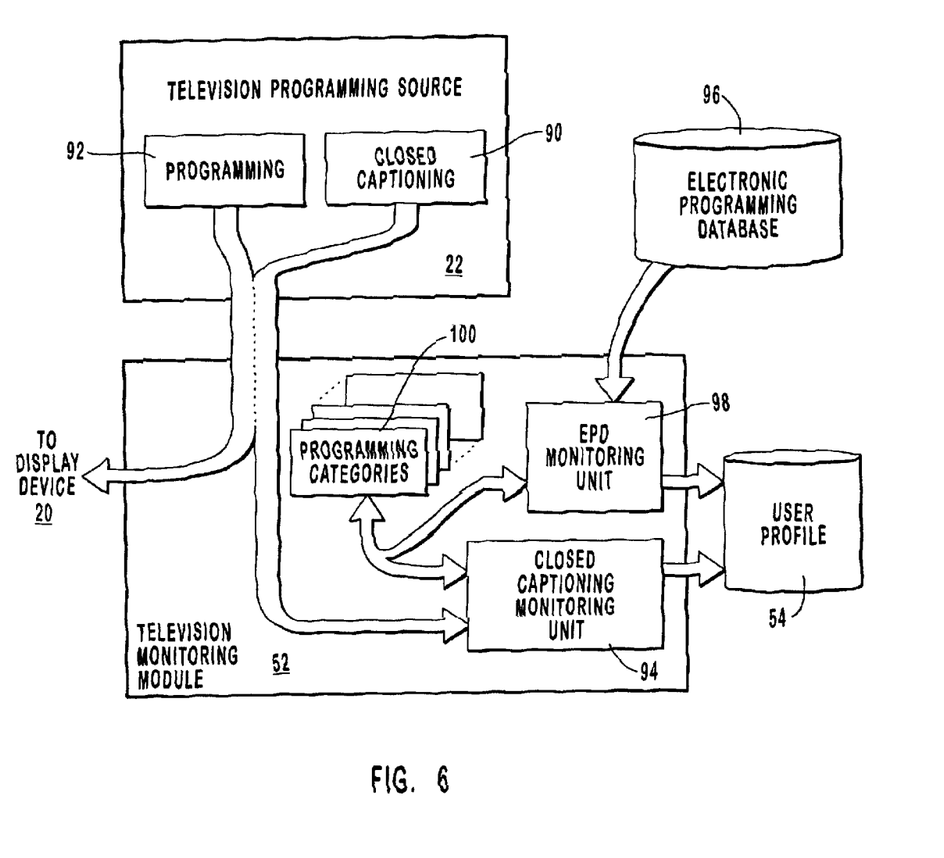
FIG. 6 is a schematic diagram further illustrating a television monitoring module and associated elements of the systems of the invention.

FIG. 6 illustrates one example of a television monitoring module that may be used with the various embodiments of the invention. In this example, television programming source 22 broadcasts closed-captioning information 90 in addition to standard programming 92. Closed-captioning information 90 is routed to a closed-captioned monitoring unit 94, which detects keywords or otherwise determines the subject matter of the television programming 92 based on the closed-captioning information 90.

Additionally, television monitoring module 52 accesses an electronic programming database ("EPD") 96 that includes written or encoded descriptions of the subject matter of television programming 92. Based on the information from electronic database 96, EPD monitoring unit 98 determines the subject matter of programming 92. Closed-captioning monitoring unit 94 and EPD monitoring unit 98 update user profile 54 with the identified subject matter of the programming 92. For example, television monitoring module 52 may have access to a plurality of programming categories similar to information categories 388 of FIG. 5. In this case, EPD monitoring unit 98 and closed-captioned monitoring unit 94 identify one or more programming categories 100 that best correspond to the subject matter of programming 92 and cause these programming categories to be included in user profile 54. For illustration purposes, FIG. 6 shows television monitoring module 52 as including a closed captioning monitoring unit 94 and an EPD monitoring unit 98, both of which are examples of means for monitoring the television programming viewed by the user. However, in many instances, only one of the foregoing monitoring units is sufficient to identify the content of the television programming. Furthermore, the invention is not limited to monitoring the content of television programming using closed captioning information or an electronic programming database, but may utilize other means for monitoring the television programming. It is also noted that either of the closed captioning monitoring unit or the EPD monitoring unit 98 in combination with programming categories 100 represent but one example of means for compiling a user profile.

The present invention may be embodied in other specific forms without departing from its spirit or other essential characteristics. The described embodiments are to be considered in all respects only as illustrative and not restrictive. The scope of the invention is, therefore, indicated by the appended claims rather than by the foregoing description. All changes which come within the range of equivalency of the claims are to be embraced within their scope.

What is claimed and desired to be secured by United States Letters Patent is:

1. In an information retrieval system including a server computer and a client system having a display device, wherein the client system has access to television programming viewed by a user of the information retrieval system, a method for inserting an advertisement into a document displayed on the display device, the method comprising the acts of:
    compiling a profile of the user of the information retrieval system at the client system, the profile including information corresponding to television programming viewed by the user, and wherein the user profile is updated every time the client views a television program;
    requesting, by the client system, an information document from the server computer;
    the client system selecting an advertisement from an advertisement repository for insertion into the information document based on the user profile, wherein the profile includes information related to only a most recently viewed television program, such that television programming viewed less recently than the most recently viewed television programming is not included in the profile for use in selecting the advertisement;
    inserting data representing the selected advertisement into the information document; and
    displaying the information document, including the selected advertisement, on the display device.

2. A method as defined in claim 1, wherein the act of inserting data representing the selected advertisement is conducted at the client system.

3. A method as defined in claim 2, further comprising, before the act of selecting an advertisement, an act of receiving a plurality of advertisements at the client system.

4. A method as defined in claim 1, wherein the information document is an HTML document.

5. A method as defined in claim 1, wherein the act of compiling the profile includes an act of including in the profile user information further characterizing the user, in addition to the television programming viewed by the user.

6. A method as defined in claim 1, wherein the information document includes news.

7. A method as defined in claim 1, wherein the information document includes reference information relating to the content of the television programming.

8. A method as defined in claim 1, wherein the act of requesting an information document is conducted without direct user assistance.

9. A method as recited in claim 1, wherein the act of compiling a profile includes an act of identifying closed captioning received from the television programming.

10. A method as recited in claim 1, wherein the selected advertisement replaces a preexisting advertisement included with the information document.

11. A method as recited in claim 1, wherein the selected advertisement is selected prior to requesting the information document.

12. A method as recited in claim 1, wherein the user profile is categorized according to topics of television programming.

13. A method as recited in claim 1, wherein information relating to the user profile is only retained in the user profile for only a predetermined period of time.

14. A computer program product for use in an information retrieval system including a server computer and a client system having a display device, wherein the client system has access to television programming viewed by a user of the information retrieval system, the computer program product comprising:
    one or more computer-readable media having computer-executable instructions for implementing the method recited in claim 1.

15. A computer program product as defined in claim 14, wherein the act of inserting data representing the selected advertisement is conducted at the client system.

16. A computer program product as defined in claim 14, further comprising, before the act of selecting an advertisement, an act of receiving a plurality of advertisements at the client system.

17. A computer program product as defined in claim 14, wherein the information document is an HTML document.

18. A computer program product as defined in claim 14, wherein the act of compiling the profile includes an act of including in the profile user information further characterizing the user, in addition to the television programming viewed by the user.

19. A computer program product as defined in claim 14, wherein the information document includes news.

20. A computer program product as defined in claim 14, wherein the information document includes reference information relating to the content of the television programming.

21. A computer program product as defined in claim 14, wherein the act of requesting an information document is conducted without direct user assistance.

22. A computer program product as recited in claim 14, wherein the act of compiling a profile includes an act of identifying closed captioning received from the television programming.

23. In an information retrieval system including a remote server, an ISP, and a client system having a display device, wherein the client system has access to television programming viewed by a user of the information retrieval system, a method for inserting an advertisement into a document displayed on the display device, the method comprising the acts of:

the remote server receiving a request from the client system for an information document from the remote server;

the remote server accessing a profile of a user from the client system, the profile including information associated with television programming viewed by the user, wherein the user profile is updated every time the client views a television program;

the remote server selecting an advertisement from an advertisement repository for insertion into the information document based on the user profile, wherein the profile includes information related to only a most recently viewed television program, such that television programming viewed less recently than the most recently viewed television programming is not included in the profile for use in selecting the advertisement;

inserting data representing the selected advertisement into the information document; and transmitting the information document to the client system.

24. A method as recited in claim 23, wherein communications between the remote server and the client system pass through an ISP.

25. A method as recited in claim 23, wherein the client system displays the information document, including the selected advertisement, on the display device of the client system.

26. A method as recited in claim 23, wherein the selected advertisement replaces a preexisting advertisement included with the information document.

27. A method as recited in claim 23, wherein the user profile is categorized according to topics of television programming.

28. A method as recited in claim 23, wherein information relating to the user profile is only retained in the user profile for only a predetermined period of time.

29. A computer program product having one or more computer-readable media having computer-executable instructions for implementing the method recited in claim 23.

30. In an information retrieval system including a remote server, an ISP, and a client system having a display device, wherein the client system has access to television programming viewed by a user of the information retrieval system, a method for inserting an advertisement into a document displayed on the display device, the method comprising the acts of:

the ISP receiving a request from the client system for an information document from the remote server;

the ISP obtaining the information document from the remote server;

the ISP accessing a profile of a user from the client system, the profile including information associated with television programming viewed by the user, wherein the user profile is updated every time the client views a television program;

the ISP selecting unit advertisement from an advertisement repository for insertion into the information document based on the user profile, wherein the profile includes information related to only a most recently viewed television program, such that television programming viewed less recently than the most recently viewed television programming is not included in the profile for use in selecting the advertisement;

the ISP inserting data representing the selected advertisement into the information document; and the ISP transmitting the information document to the client system.

31. A method as recited in claim 30, the ISP accesses and stores the profile prior to receiving the request for the information document.

32. A method as recited in claim 30, wherein the client system displays the information document, including the selected advertisement, on the display device of the client system.

33. A method as recited in claim 30, wherein the selected advertisement replaces a preexisting advertisement included with the information document.

34. A method as recited in claim 30, wherein the advertisement is selected by the ISP, based on the user profile, prior to receiving the request for the information document.

35. A method as recited in claim 30, wherein user profile information is received by the ISP each time the client requests an information document.

36. A method as recited in claim 30, wherein user profile information is received by the ISP each time the client begins a new Internet session that is served by the ISP.

37. A method as recited in claim 30, wherein user profile information is received by the ISP on a daily basis.

38. A method as recited in claim 30, wherein the user profile is categorized according to topics of television programming.

39. A method as recited in claim 30, wherein information relating to the user profile is only retained in the user profile for only a predetermined period of time.

40. A computer program product having one or more computer-readable media having computer-executable instructions for implementing the method recited in claim 30.

* * * * *

UNITED STATES PATENT AND TRADEMARK OFFICE
CERTIFICATE OF CORRECTION

| | | |
|---|---|---|
| PATENT NO. | : 7,051,351 B2 | Page 1 of 1 |
| APPLICATION NO. | : 09/264432 | |
| DATED | : May 23, 2006 | |
| INVENTOR(S) | : Goldman et al. | |

It is certified that error appears in the above-identified patent and that said Letters Patent is hereby corrected as shown below:

In column 13, line 19, after "unit" insert -- 94 --.

In column 14, line 30, in Claim 14, after "product" insert -- stored on one or more computer-readable media --.

In column 14, line 36, in Claim 14, insert -- the -- before "one or more".

In column 15, line 44, in Claim 29, after "product" delete "having" and insert -- stored on --, therefor.

In column 16, line 10, in Claim 30, after "selecting" delete "unit" and insert -- an --, therefor.

In column 16, line 49, in Claim 40, after "product" delete "having" and insert -- stored on --, therefor.

Signed and Sealed this

Twentieth Day of April, 2010

David J. Kappos
*Director of the United States Patent and Trademark Office*